United States Patent
Kim et al.

(10) Patent No.: US 10,230,682 B2
(45) Date of Patent: Mar. 12, 2019

(54) METHOD FOR INTEGRATED MANAGEMENT OF MESSAGES AND ELECTRONIC DEVICE IMPLEMENTING SAME

(71) Applicant: SAMSUNG ELECTRONICS CO., LTD., Suwon-si, Gyeonggi-do (KR)

(72) Inventors: Hyun-Il Kim, Seoul (KR); Hyun-Sik Ki, Yongin-si (KR); Bosung Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 53 days.

(21) Appl. No.: 15/390,893

(22) Filed: Dec. 27, 2016

(65) Prior Publication Data
US 2017/0201485 A1    Jul. 13, 2017

(30) Foreign Application Priority Data

Jan. 7, 2016    (KR) .......................... 10-2016-0001959

(51) Int. Cl.
*H04W 4/00*    (2018.01)
*H04L 12/58*    (2006.01)
(Continued)

(52) U.S. Cl.
CPC ............. *H04L 51/36* (2013.01); *H04L 51/16* (2013.01); *H04L 51/38* (2013.01); *H04M 1/72547* (2013.01); *H04W 4/12* (2013.01)

(58) Field of Classification Search
USPC .................. 455/466, 456.3, 413; 705/26.61; 709/206
See application file for complete search history.

(56) References Cited

U.S. PATENT DOCUMENTS 7,620,407 B1 * 11/2009 Donald .................... H04L 51/38
                                                              455/466
9,584,458 B2 *  2/2017 Saraya ..................... G06F 3/048
(Continued)

FOREIGN PATENT DOCUMENTS

KR        2001-0106043      11/2001
KR    10-2006-0107214      10/2006
(Continued)

*Primary Examiner* — David Q Nguyen
(74) *Attorney, Agent, or Firm* — Nixon & Vanderhye P.C.

(57) ABSTRACT

Various embodiments provide an electronic device and method therefor, the electronic device including: a display; at least one communication circuit configured to perform wireless communication with an external electronic device using one of a plurality of communication protocols; a processor electrically connected to the display and the communication circuit; and a memory electrically connected to the processor, wherein the memory stores a plurality of messaging applications for providing one of a plurality of messaging services, and the memory stores instructions which, when executed by a processor, cause the processor to perform operations comprising: displaying a user interface on the display, in which the user interface is configured to provide, to one message thread, the plurality of messaging applications or outgoing and incoming messages associated with the plurality of messaging services; storing, in the memory, a plurality of first identifications (IDs) identifying communication with the external electronic device and/or an account associated with the external electronic device, using one of each of the plurality of messaging applications and the plurality of messaging services; storing, in the memory, at least one second ID identifying a message thread associated with communication with the external electronic device and/or an account associated with the external electronic device; receiving a new incoming message using the at least one communication circuit; and selecting a message thread (Continued)

for the new incoming message at least partially based on at least one of the first IDs and the second ID.

20 Claims, 13 Drawing Sheets

(51) Int. Cl.
*H04M 1/725* (2006.01)
*H04W 4/12* (2009.01)

(56) References Cited

U.S. PATENT DOCUMENTS

| | | | |
|---|---|---|---|
| 2008/0039121 A1* | 2/2008 | Muller | H04M 7/0036 455/456.3 |
| 2009/0061827 A1* | 4/2009 | Bulgin | H04M 1/6505 455/413 |
| 2013/0227030 A1* | 8/2013 | Eidelson | H04L 67/1095 709/206 |
| 2014/0122297 A1* | 5/2014 | Dunlap | H04W 4/14 705/26.61 |
| 2014/0122626 A1 | 5/2014 | Alam | |
| 2015/0295873 A1* | 10/2015 | Orr | H04L 51/16 715/752 |
| 2016/0286027 A1 | 9/2016 | Lee et al. | |

FOREIGN PATENT DOCUMENTS

| | | |
|---|---|---|
| KR | 10-2006-0124890 | 12/2006 |
| KR | 10-2008-0038114 | 5/2008 |
| KR | 10-0913193 | 8/2009 |
| KR | 10-2014-0054481 | 5/2014 |
| KR | 10-2014-0085634 | 7/2014 |
| KR | 10-2015-0067700 | 6/2015 |
| KR | 10-2016-0113833 | 10/2016 |

* cited by examiner

METHOD FOR INTEGRATED MANAGEMENT OF MESSAGES AND ELECTRONIC DEVICE IMPLEMENTING SAME

CROSS-REFERENCE TO RELATED APPLICATION

This application is based on and claims priority under 35 U.S.C. § 119 to Korean Application Serial No. 10-2016-0001959, which was filed in the Korean Intellectual Property Office on Jan. 7, 2016, the disclosure of which is incorporated by reference herein in its entirety.

TECHNICAL FIELD

The present disclosure relates generally to a method and apparatus for integrated management of messages.

BACKGROUND

Recently, with the development of digital technology, various types of electronic devices such as a mobile communication terminal, a Personal Digital Assistant (PDA), an electronic scheduler, a smart phone, a tablet Personal Computer (PC), a wearable device, etc. have been widely used. The electronic device has various functions such as a voice call, message transmission like a Short Message Service (SMS)/Multimedia Message Service (MMS), a video call, an electronic organizer, photography, email transmission/reception, broadcast reproduction, Internet, music reproduction, schedule management, Social Networking Service (SNS), messenger, dictionary, game, and the like.

The electronic device may use an SMS or MMS as a message transmitting means when transmitting a message, and provide various Instant Messenger (hereinafter, referred to as IM) services through various applications. Therefore, a user may subscribe to a desired messaging service among various instant messaging services and use the same, so that range of selection of messaging service has widened.

Although the range of selection of messaging services is widened as messaging services have become diverse, there is an inconvenience in that the user must select a messaging service to be used each time a message is transmitted. Although various integrated messaging services are provided in order to reduce the inconvenience, there is a disadvantage in that an application for substantially integrated management of messages is required to be separately installed.

SUMMARY

Various example embodiments may provide a method and apparatus which can perform an integrated management for a plurality of messaging services, and manage a conversation thread in an integrated messenger.

An electronic device according to various example embodiments may include: a display; at least one communication circuit configured to perform wireless communication with an external electronic device using one of a plurality of communication protocols; a processor electrically connected to the display and the communication circuit; and a memory electrically connected to the processor, wherein the memory stores a plurality of messaging applications for providing one of a plurality of messaging services, and the memory stores instructions which, when executed by the processor, cause the processor to perform operations comprising: displaying a user interface on the display, wherein the user interface is configured to provide, to one message thread, the plurality of messaging applications and/or outgoing and incoming messages associated with the plurality of messaging services; storing, in the memory, a plurality of first identifications (IDs) identifying communication with the external electronic device and/or an account associated with the external electronic device, using one of each of the plurality of messaging applications and the plurality of messaging services; storing, in the memory, at least one second ID identifying a message thread associated with communication with the external electronic device and/or the account associated with the external electronic device; receiving a new incoming message using the at least one communication circuit; and selecting a message thread for the new incoming message at least partially based on at least one of the first IDs and the second ID.

A method of operating an electronic device according to various example embodiments may include: displaying a user interface that provides, to one message thread, a plurality of messaging applications and outgoing and incoming messages associated with a plurality of messaging services; storing, in a memory, a plurality of first identifications (IDs) identifying communication with the external electronic device and/or an account associated with the external electronic device, using one of each of the plurality of messaging applications and the plurality of messaging services; storing, in the memory, at least one second ID identifying a message thread associated with communication with the external electronic device and/or an account associated with the external electronic device; receiving a new incoming message using at least one communication circuit; and selecting a message thread for the new incoming message at least partially based on at least one of the first IDs and the second ID.

According to various example embodiments, a plurality of messaging services may be integrated and managed, and a conversation thread may be managed by an integrated messenger.

According to various example embodiments, various messaging services which are installed in an electronic device using a messenger application may be conveniently used.

According to various example embodiments, when a message transmission is not performed using a first messaging service, the message is re-transmitted using a second messaging service, so that a cost burden caused by the message retransmission can be reduced.

According to various example embodiments, a session for each messaging service can be maintained and managed, so that a messaging service can be continuously provided through one messenger application.

According to various example embodiments, a messenger application can be allowed to be connected to a new messaging service so as to be extensively applicable thereto.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
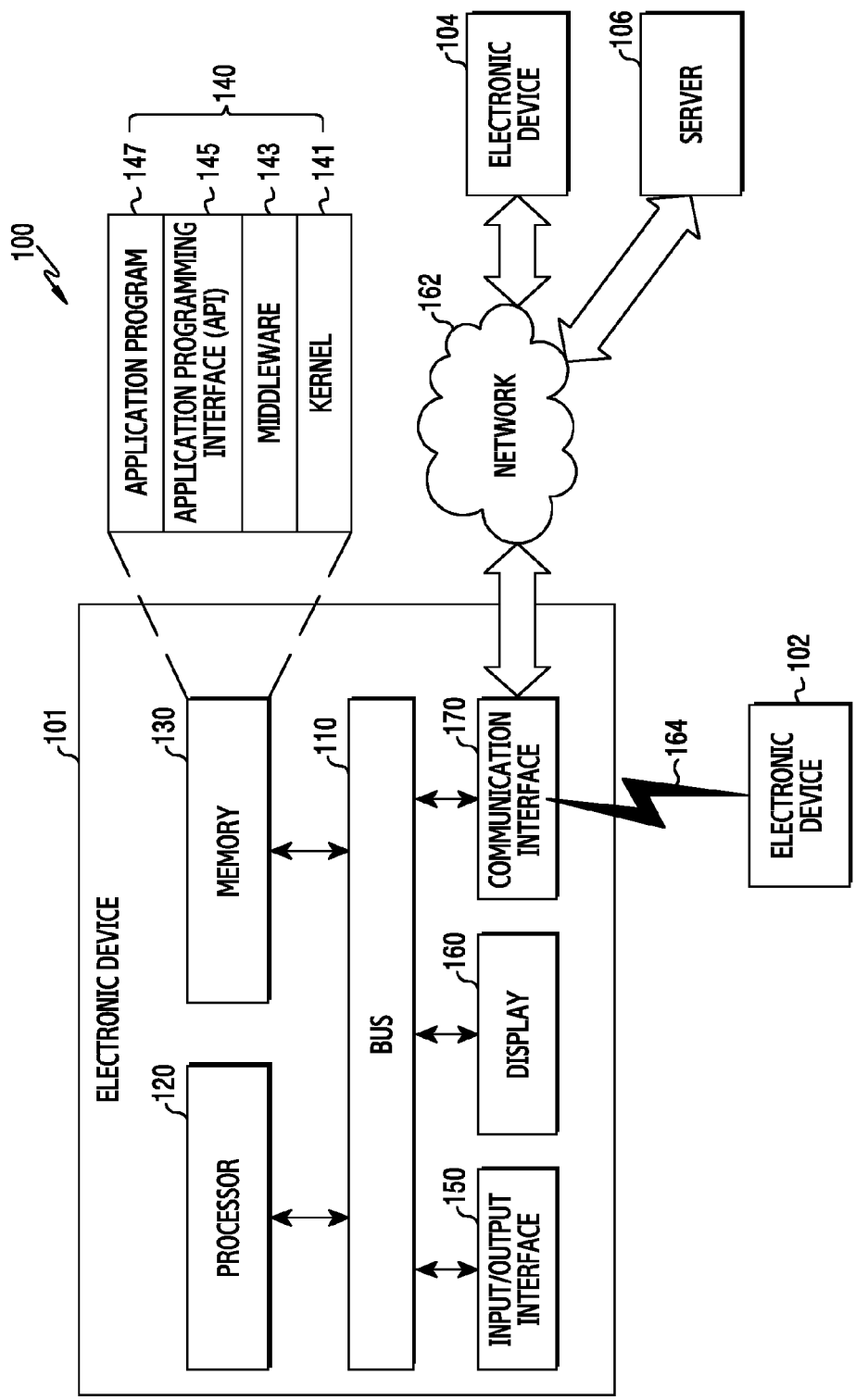
FIG. 1 is a diagram illustrating an example electronic device within a network environment according to various example embodiments.

Hereinafter, various example embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B. The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer, for example, to a situation in which the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe example embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the present disclosure.

An electronic device 101 within a network environment 100, according to various embodiments, will be described with reference to FIG. 1. The electronic device 101 may include a bus 110, a processor 120, a memory 130, an input/output interface (e.g., including input/output circuitry) 150, a display 160, and a communication interface (e.g., including communication circuitry) 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output circuitry provided to function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry provided to establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
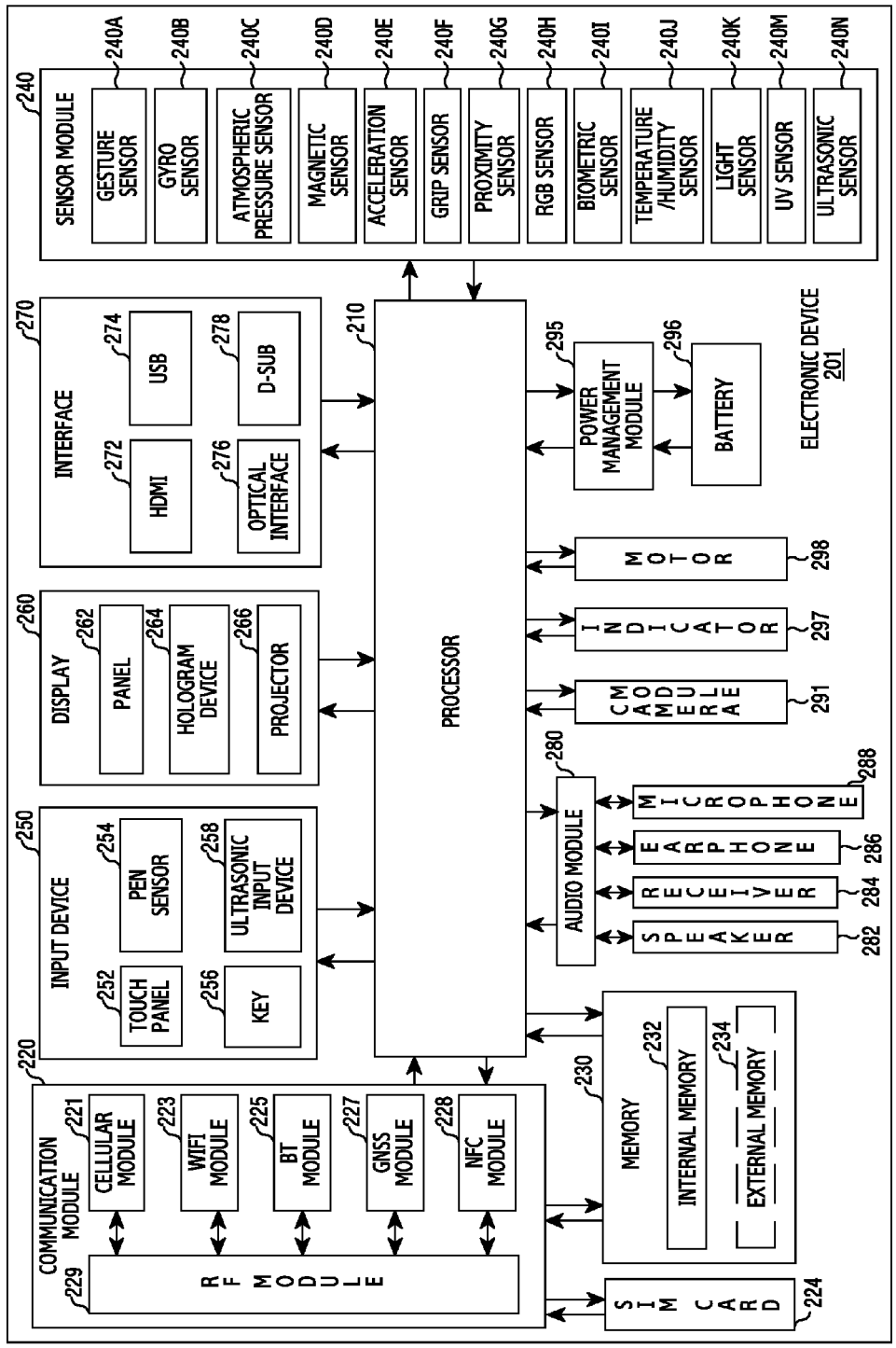
FIG. 2 is a block diagram illustrating an example configuration of the electronic device according to various example embodiments.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors 210 (e.g., Application Processors (AP)), a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (e.g., a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (e.g: SIM card) 224 (e.g., the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G; a color sensor 240H (e.g., red, green, and blue (RGB) sensor), a biometric sensor (medical sensor) 240I, a temperature/humidity sensor 240J, an illuminance (e.g., light) sensor 240K, a Ultra Violet (UV) sensor 240M and an ultrasonic sensor 240N. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
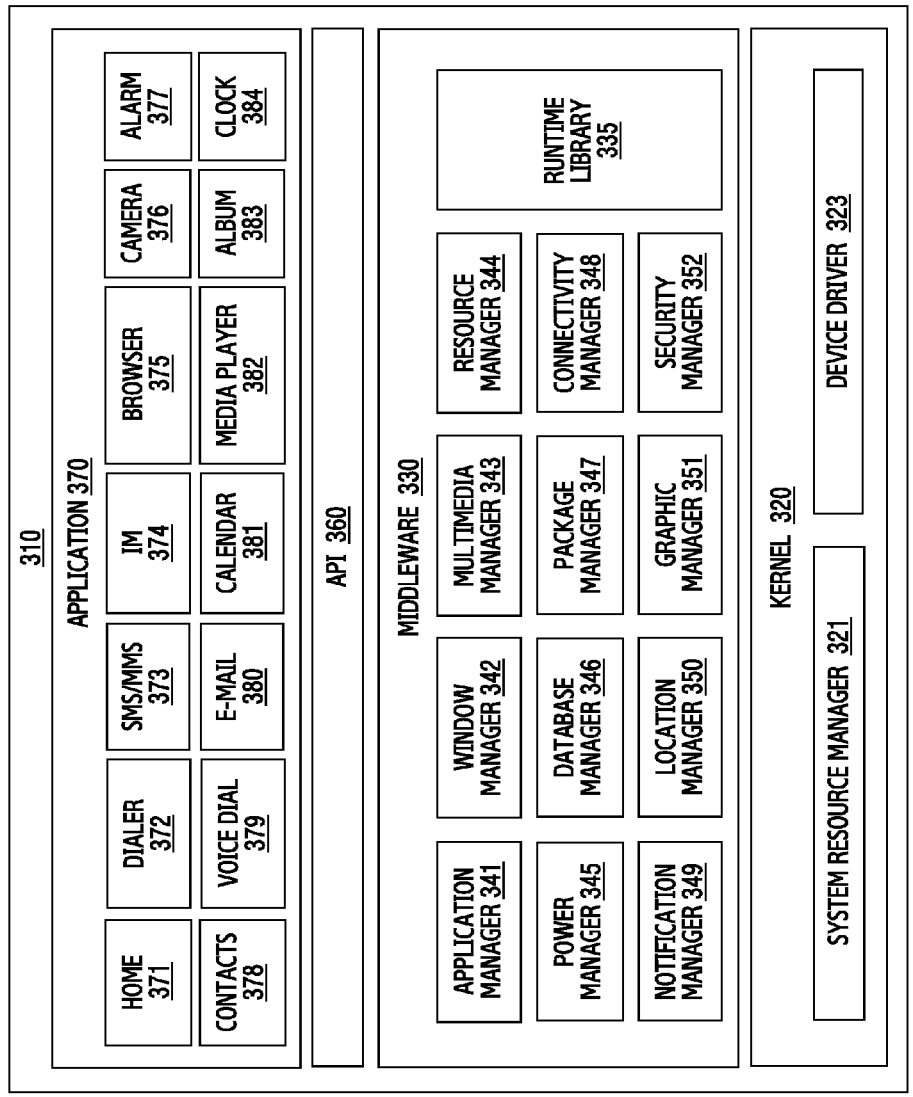
FIG. 3 is a block diagram illustrating an example program module according to various example embodiments.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information), not shown.

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of processing circuitry, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The electronic device described below may be the electronic device 101 of FIG. 1 or the electronic device 201 of FIG. 2. However, for convenience of explanation, the electronic device described below may be described as the electronic device 101 of FIG. 1. However, the electronic device is not necessarily limited to the electronic device 101 of FIG. 1 by the description.

Figure 4:
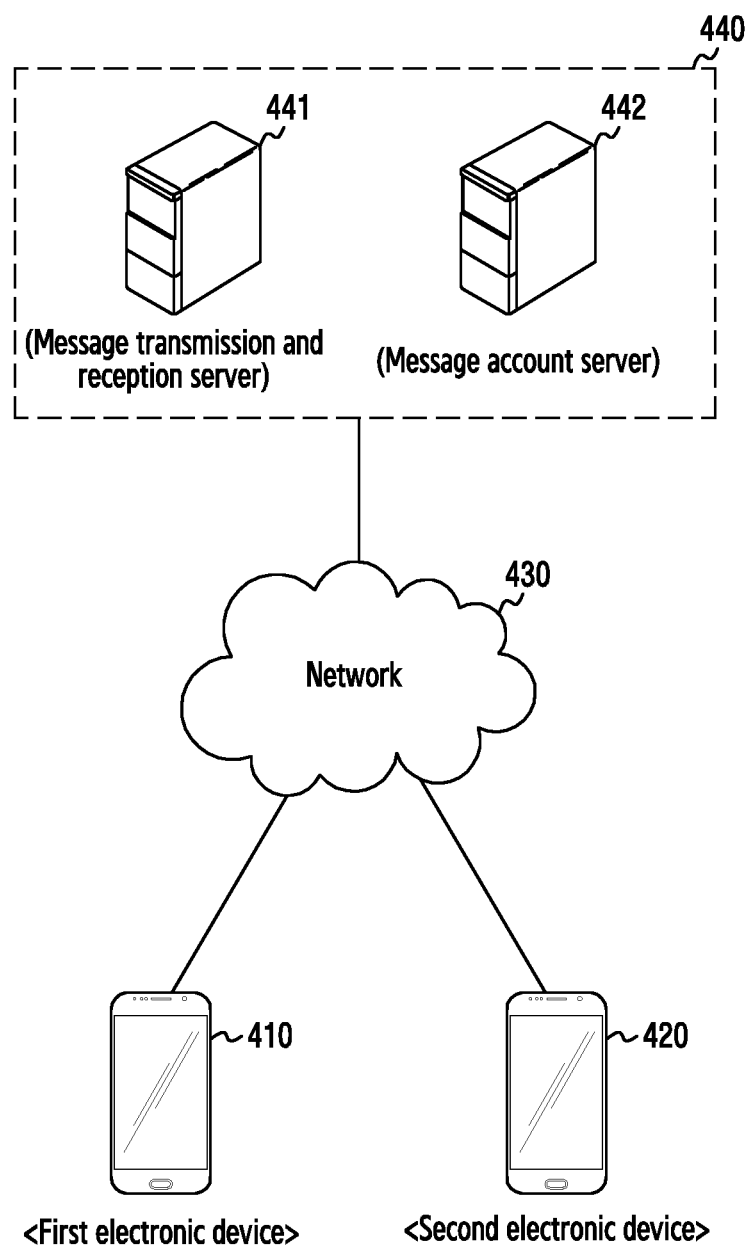
FIG. 4 is a diagram illustrating an example network environment of an electronic device and a server according to various example embodiments.

FIG. 4 is a diagram illustrating an example network environment of an electronic device and a server according to various example embodiments.

Referring to FIG. 4, according to an example embodiment of the present disclosure, a message integrated management system 440 may include a message transmission and reception server 441 and a message account server 442. The message transmission and reception server 441 may serve as a server for transmitting and receiving messages, and provide a message transmission and reception function, a function of checking whether the message transmission and reception is successful, a function of checking whether the message is received by the recipient, and the like. The message account server 442 may serve as a server for managing users who have subscribed to a messaging service (or a messenger service), and provide functions such as subscription, account management, and checking whether the subscription has been made.

According to an embodiment of the present disclosure, the message integrated management system 440 may provide a messenger application (or a messaging application), and provide a function associated with message transmission and reception through the messenger application. For example, the messenger application may serve to allow different types of messaging services to be used through a single application. For example, the messenger application may refer to an application which can provide both a message transmitted or received using a first messaging service and a message transmitted or received using a second messaging service. When the message transmission is not available using the first messaging service, the messenger application may transmit the message using the second messaging service.

According to various embodiments, the messenger application may be basically provided while being installed in the electronic device 101 when the electronic device (for example, the electronic device 101 of FIG. 1 or the electronic device 201 of FIG. 2) is manufactured. For example, after purchasing the electronic device 101, a user may transmit or receive a message through the messenger application without a separate installation thereof.

According to an embodiment of the present disclosure, the messenger application may be installed in the electronic device 101 according to the user's selection. In this case, the messenger application may be an application that is not basically installed in the electronic device 101 but is required to be separately installed after the user purchased the electronic device 101. The fact of whether the messenger application is basically installed in the electronic device 101 or not corresponds only to various embodiments of the present disclosure, and the present disclosure is not necessarily limited to these embodiments.

According to an embodiment of the present disclosure, although the message transmission and reception server 441 and the message account server 442 are illustrated separately in drawings, the message transmission and reception server 441 may also perform a function of the message account server 442. Alternatively, the message account server 442 may also perform a function of the message transmission and reception server 441. In this case, the message integrated management system 440 may include only the message transmission and reception server 441, or may include only the message account server 442.

According to an embodiment of the present disclosure, the message account server 442 may assign a session ID to each messaging service. For example, in a case of an IP-based message (for example, Rich Communications Services (RCS) message), a session connection may be required for the message transmission and reception. The message account server 442 may assign session identification (ID) to each messaging service for the message transmission and reception. The assigned session ID may be transmitted to electronic devices (for example, the first electronic device 410 and the second electronic device 420), which make a request for the transmission or reception of the message. The message account server 442 may generate a session ID based on a messaging service for assigning the session ID and an electronic device (for example, a phone number of the electronic device) which makes a request for the generation of a session ID. The message account server 442 may store the generated session ID in a database, and transmit the generated session ID to the electronic device which made a request for the session ID generation. For example, the database may store a session ID for each messaging service in connection with the phone number of the electronic device. Alternatively, the database may store a session ID for each phone number of the electronic device in connection with the messaging service.

According to an embodiment of the present disclosure, when the first electronic device 410 makes a request for the message transmission, the message account server 442 may notify the first electronic device 410 of whether a message reception by the second electronic device 420 is possible using a messaging service (for example, the first messaging service) that has requested the message transmission. For example, the message account server 442 may determine whether the session ID for the first messaging service is stored in the database, with reference to the database, so that the message account server 442 may determine whether a message reception by the second electronic device 420 using the first messaging service is possible.

According to an embodiment of the present disclosure, the message transmission and reception server 441 may receive a message from the first electronic device 410 through the network 430, and transmit the received message to the second electronic device 420. The message transmission and reception server 441 may check whether the message has been successfully transmitted to the second electronic device 420. The message transmission and reception server 441 may notify the first electronic device 410 of whether the message has been successfully transmitted to the second electronic device 420.

According to an embodiment of the present disclosure, the first electronic device 410 may be an electronic device of a sender, and may be a device for transmitting the message through the messenger application. The first electronic device 410 may store a conversation thread table and a session table in a memory (for example, the memory 130). The conversation thread table may store a thread ID corresponding to a counterpart's phone number (for example, the phone number of the second electronic device 420). The session table may store a type of a messaging service and a session ID corresponding to the thread ID. The first electronic device 410 may assign one thread ID per counterpart's phone number. The counterpart's phone number may be an identification number of an electronic device, and include at least one of International Mobile Station Identity (IMSI), Temporary Mobile Subscriber Identity (TMSI), Mobile Identification Number (MIN), Mobile Station International ISDN Number (MSISDN), International Mobile Equipment Identity (IMEI), Personal Identification number (PIN), or header field information of P-Associated-Uniform Resource Identifiers (URI). In addition, the counterpart's phone number may include various embodiments which may be used according to a communication standard or a service provider's policy. The Session ID may be assigned from the message account server 442, and one ID may be assigned to one messaging service corresponding to the thread ID. The session ID may be associated with a phone number.

According to an embodiment of the present disclosure, the first electronic device 410 may determine a messaging service to be used for message transmission in consideration of a messaging service that can be used by a sender or recipient. The first electronic device 410 may request the second electronic device 420 for the message transmission using a messaging service determined through the network 430. In response to the message transmission request, the first electronic device 410 may receive whether a message reception by the second electronic device 420 is possible, from the message account server 442.

According to an embodiment of the present disclosure, the first electronic device 410 may transmit a message to the message transmission and reception server 441 and determine another messaging service based on whether the message reception is possible. For example, when the message reception by second electronic device 420 which uses the determined messaging service (for example, the first messaging service) is possible, the first electronic device 410 may transmit the message using the determined messaging service. When the message reception by the second electronic device 420 which uses the determined messaging service (for example, the first messaging service) is not possible, the first electronic device 410 may transmit the message using a different messaging service (for example, the second messaging service).

According to an embodiment of the present disclosure, when transmitting the message, the first electronic device 410 may also transmit a session ID corresponding to a messaging service which is determined to transmit the message. For example, the first electronic device 410 may search for, from the search table, a thread ID of the second electronic device 420 and a session ID corresponding to the determined messaging service. If the session ID is not retrieved, the first electronic device 410 may request for the generation of a session ID to the message account server 442. In response to the session ID generation request, the first electronic device 410 may receive the session ID from the message accounting server 442 and store the received session ID in the session table. The first electronic device 410 may transmit the message along with the session ID stored in the session table.

According to an embodiment of the present disclosure, the second electronic device 420 may be an electronic device of a recipient, and may be a device for receiving the message through the messenger application. The second electronic device 420 may store a conversation thread table and a session table in a memory (for example, the memory 130). The conversation thread table may store a thread ID corresponding to a counterpart's phone number (for example, a phone number of the first electronic device 410). The session table may store a type of a messaging service and a session ID corresponding to the thread ID. The second electronic device 420 may assign one thread ID per counterpart's phone number. The Session ID may be assigned from the message account server 442, and one ID may be assigned to one messaging service corresponding to the thread ID.

According to an embodiment of the present disclosure, when receiving a message from the first electronic device 410 through the network 430, the second electronic device 420 may acquire session information (for example, a session ID) from the received message and display the received message based on the acquired session information. For example, the second electronic device 420 may obtain a thread ID corresponding to a session ID from the session table, and execute a messaging service corresponding to the acquired thread ID. The second electronic device 420 may display the received message on a chat window (for example, a message thread) of the executed messaging service.

According to various embodiments, when session information has not been acquired from the received message, the second electronic device 420 may perform a process for generating session information or perform a process for generating thread information. For example, the second electronic device 420 may determine whether the phone number of the first electronic device 410 is stored in the conversation thread table. When the phone number of the first electronic device 410 is stored in the conversation thread table, the second electronic device 420 may acquire a thread ID corresponding to the phone number of the first electronic device 410. The second electronic device 420 may execute a messaging service corresponding to the acquired thread ID, and display the received message on a chat window (for example, a message thread) of the executed messaging service. In addition, the second electronic device 420 may make a request for generation of a session ID to the message account server 442 and receive the session ID from the message account server 442.

According to an embodiment of the present disclosure, when the phone number of the first electronic device 410 is not stored in the conversation thread table, the second electronic device 420 may assign a new thread ID to the phone number of the first electronic device 410. The second electronic device 420 may execute a messaging service corresponding to the new thread ID, and display the received message on a chat window (for example, a message thread) of the executed messaging service. The second electronic device 420 may store the assigned thread ID in the conversation thread table so as to correspond to the phone number of the first electronic device 410. In addition, the second electronic device 420 may make a request for generation of a session ID to the message account server 442 and receive the session ID from the message account server 442.

Figure 5:
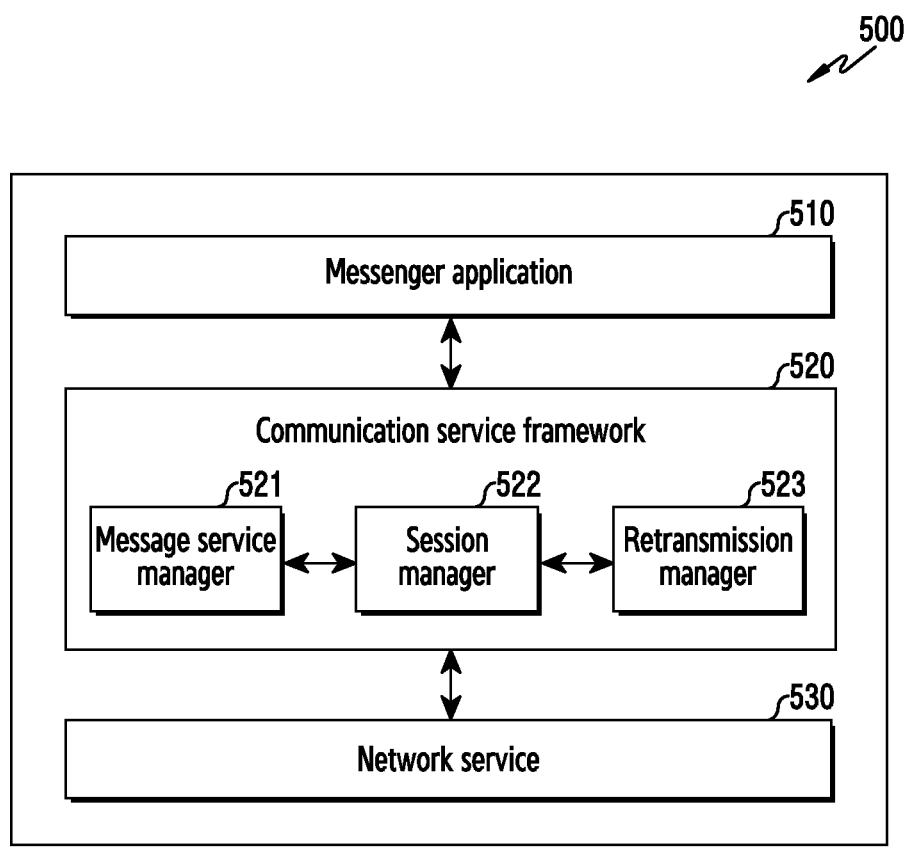
FIG. 5 is a block diagram illustrating an example program module associated with a messaging service according to various example embodiments.

FIG. 5 is a block diagram illustrating an example program module associated with a messaging service according to various example embodiments.

Referring to FIG. 5, according to an embodiment of the present disclosure, the program module 500 associated with a messaging service may include a messenger application 510, a communication service framework 520, and a network service 530. The program module 500 associated with the messaging service is to describe a program module associated with the "messaging service" in detail, and the basic configuration of the program module may be the same as or similar to the program module 310 of FIG. 3. That is, although not shown, the program module 500 may further include an API (for example, the API 360 of FIG. 3) and a kernel (for example, the kernel 320 of FIG. 3).

According to an embodiment of the present disclosure, the messenger application 510 may refer to an application for providing a messaging service. The messenger application 510 may display a conversation counterpart (for example, a counterpart name, a counterpart phone number, etc.) and a conversation thread, and display messages exchanged with the conversation counterpart when the conversation thread is selected. The conversation thread may refer to any one of a message list including a plurality of messages, which is arranged as a conversation counterpart. The conversation counterpart, the conversation thread, or the message may be deleted. The messenger application 510 may display information on an individual or a conversation counterpart. The messenger application 510 may display a result of processing so as to correspond to a user input. The messenger application 510 may display a user interface or user experience interface associated with a message.

According to an embodiment of the present disclosure, the messenger application 510 may allow different types of messaging services to be used through a single application. For example, the messenger application 510 may refer to an application which can provide both a message transmitted or received using a first messaging service and a message transmitted or received using a second messaging service. When the message transmission is not possible by using the first messaging service, the messenger application 510 may transmit the message by using the second messaging service. The messenger application 510 may be basically provided while being mounted on the electronic device 101 when the electronic device 101 is manufactured. Alternatively, the messenger application 510 may be installed in the electronic device 101 according to the user's selection.

According to an embodiment of the present disclosure, the communication service framework 520 may be a framework for providing a messaging service, and correspond to the middleware 330 or kernel 320 of FIG. 3. The communication service framework 520 may include a message manager 521, a session manager 522, and a retransmission manager 523. The message manager 521 may be a module for a messaging service. For example, the message manager 521 may provide a messaging service such as RCS, Short Message Service (SMS)/Multimedia Message Service (MIMS), or Instant Messenger (IM), and may be connected in a plug-in type when an application for a messaging service is installed.

According to an embodiment of the present disclosure, in order to perform an operation of grouping messages for each conversation thread and managing the same, the session manager 522 may manage a thread ID, a type of a messaging service used in the conversation thread, and the session ID of the messaging service used in the conversation thread. The session manager 522 may assign one thread ID per counterpart's phone number. The session manager 522 may store the assigned thread ID in the conversation thread table so as to correspond to the counterpart's phone number. In addition, the session manager 522 may store, in the session table, the messaging service type used in the conversation thread and the session ID of the messaging service used in the conversation thread. When there is no session ID corresponding to the messaging service used in the conversation thread, the session manager 522 may request for generation of a session ID to the message account server 442.

According to an embodiment of the present disclosure, when a message transmission has failed, the retransmission manager 523 may select another messaging service and transmit the message. For example, the retransmission manager 523 may select an appropriate messaging service in consideration of the priority assigned to a messaging service or the usability thereof. For example, when message transmission using the first messaging service has failed, the retransmission manager 523 may select a second messaging service. Alternatively, the retransmission manager 523 may select, based on the priority, a first messaging service having the highest priority (for example, the first priority). When message transmission using the first messaging service has failed, the retransmission manager 523 may select a second messaging service having the second highest priority.

According to an embodiment of the present disclosure, the network service 530 may provide a service that can communicate with an external device (for example, the electronic device 102 and electronic device 104). The network service 530 may be a subject for transmitting a message, and may be, for example, a communication module (for example, the communication interface 170 of FIG. 1 or the communication module 220 of FIG. 2). The network service 530 may transmit a message to a messaging service determined in the communication service framework 520.

An electronic device described below may include a program module illustrated in FIG. 5.

Figure 6:
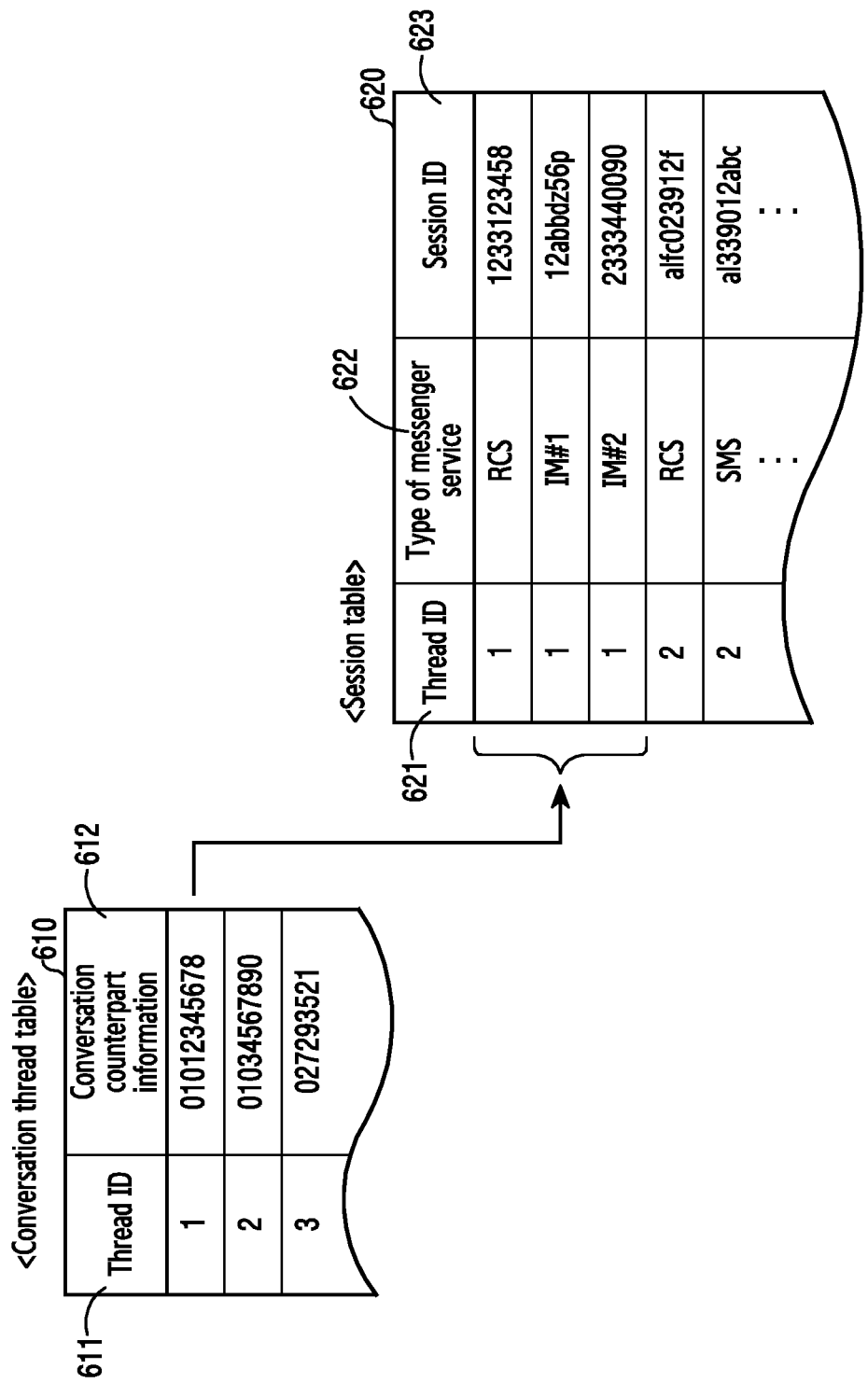
FIG. 6 is a diagram illustrating an example configuration of a table associated with a messaging service according to various example embodiments.

FIG. 6 is a diagram illustrating an example configuration of a table associated with a messaging service according to various example embodiments.

Referring to FIG. 6, according to an embodiment of the present disclosure, a conversation thread table 610 may include a thread ID 611 and conversation counterpart information 612 corresponding to the thread ID 611. The thread ID 611 may be assigned in a one-to-one method to correspond to the conversation counterpart information 612. For example, the thread ID 611 may be numbers and be described in various forms such as letters, symbols, etc. as well as numbers. The conversation counterpart information 612 may be address information on the conversation counterpart, for example, a counterpart's phone number (for example, 010-1234-5678, 010-3456-7890, etc.). When transmitting or receiving a message, the processor 120 of the electronic device 101 may check the thread ID 611 corresponding to the counterpart's phone number, and when there is no thread ID 611 corresponding to the counterpart's phone number, the electronic device 101 may generate the thread ID 611.

According to an embodiment of the present disclosure, the session table 620 may include a type of a messaging service 622 and session ID 623 for each thread ID 621. The session table 620 may include one or more messaging service types 622 and session IDs 623 for each thread ID 621. For example, the session table 620 may include a type of a messaging service RCS, IM#1, and IM#2 corresponding to the thread ID 621 of '1', include the session ID 623 of '1233123458' corresponding to the messaging service type 'RCS', include the session ID 623 of '12abbdz56p' corresponding to the messaging service type 'IM#1', and include session ID 623 '2333440090' corresponding to the messaging service types of 'IM#2'. This may indicate that a user corresponding to counterpart's phone number '010-1234-5678' is engaged in a conversation through three types of messaging services.

According to an embodiment of the present disclosure, the processor 120 of the electronic device 101 may check a messaging service available when transmitting or receiving a message, and when there is no session ID for the messaging service, the processor 120 may request for the generation of a session ID to the message account server 442. When the generated session ID is received from the message account server 442, the processor 120 may store the received session ID in the session table 620. When storing the session ID, the processor 120 may also store a type of a messaging service and a thread ID corresponding to the session ID.

An electronic device according to various embodiments may include: a display; at least one communication circuit configured to perform wireless communication with an external electronic device using one of a plurality of communication protocols; a processor electrically connected to the display and the communication circuit; and a memory electrically connected to the processor, wherein the memory stores a plurality of messaging applications for providing one of a plurality of messaging services, and the memory stores instructions which, when executed by a processor, cause the processor to perform operations comprising: displaying a user interface on the display, wherein the user interface is configured to provide, to one message thread, the plurality of messaging applications and/or outgoing and incoming messages associated with the plurality of messaging services; storing, in the memory, a plurality of first identifications (IDs) identifying communication with the external electronic device and/or an account associated with the external electronic device, using one of each of the plurality of messaging applications and the plurality of messaging services; storing, in the memory, at least one second ID identifying a message thread associated with communication with the external electronic device and/or an account associated with the external electronic device; receiving a new incoming message using the at least one communication circuit; and selecting a message thread for the new incoming message based on at least a part of the first IDs and the second ID.

The first ID may include a session ID, and the second ID may include a thread ID.

The thread ID may be associated with a phone number.

The phone number may include at least one of: International Mobile Station Identity (IMSI), Temporary Mobile Subscriber Identity (TMSI), Mobile Identification Number (MIN), Mobile Station International ISDN Number (MSISDN), International Mobile Equipment Identity (IMEI), Personal Identification number (PIN), and header field information of P-Associated-Uniform Resource Identifiers (URI).

The session ID may be associated with a phone number.

The plurality of messaging services may include two or more of SMS, MIMS, Instant Messaging, and RCS.

The processor may be configured to determine a messaging service for transmitting an outgoing message among the plurality of messaging services, to check whether a message reception by the counterpart electronic device of a counterpart phone number which will receive the outgoing message is possible, using the determined messaging service among a plurality of messaging services, and to determine another messaging service when the message reception using the determined messaging service is not possible.

The processor may be configured to check whether the transmitted message is received by a counterpart electronic device, and to determine another messaging service when the transmitted message is not received by the counterpart electronic device.

The processor may be configured to determine the messaging service based on a user determination method, and the user determination method may be configured to receive a messaging service based on a received selection when the message transmission is requested, or configured to determine the messaging service based on the priority previously determined by the user.

The processor may be configured to determine the messaging service based on an automatic determination method, and the automatic determination method may be configured to arbitrarily select one messaging service or select the messaging service based on a predetermined condition, or to determine a messaging service based on the number of times the messaging services have been used by the plurality of users, the number of times the messaging services have been used by the user, a messaging service recently used by the user, or a new messaging service.

A message is received from a counterpart electronic device, the processor may be configured to acquire session information from the received message, to acquire second ID based on the acquired session information, and to display the received message on a message thread corresponding to the second ID.

When the session information in the memory does not exist, the processor may be configured to determine whether conversation counterpart information associated with the counterpart electronic device exists in the conversation thread table, and to acquire second ID corresponding to the conversation counterpart information stored in the conversation thread table.

Figure 7:
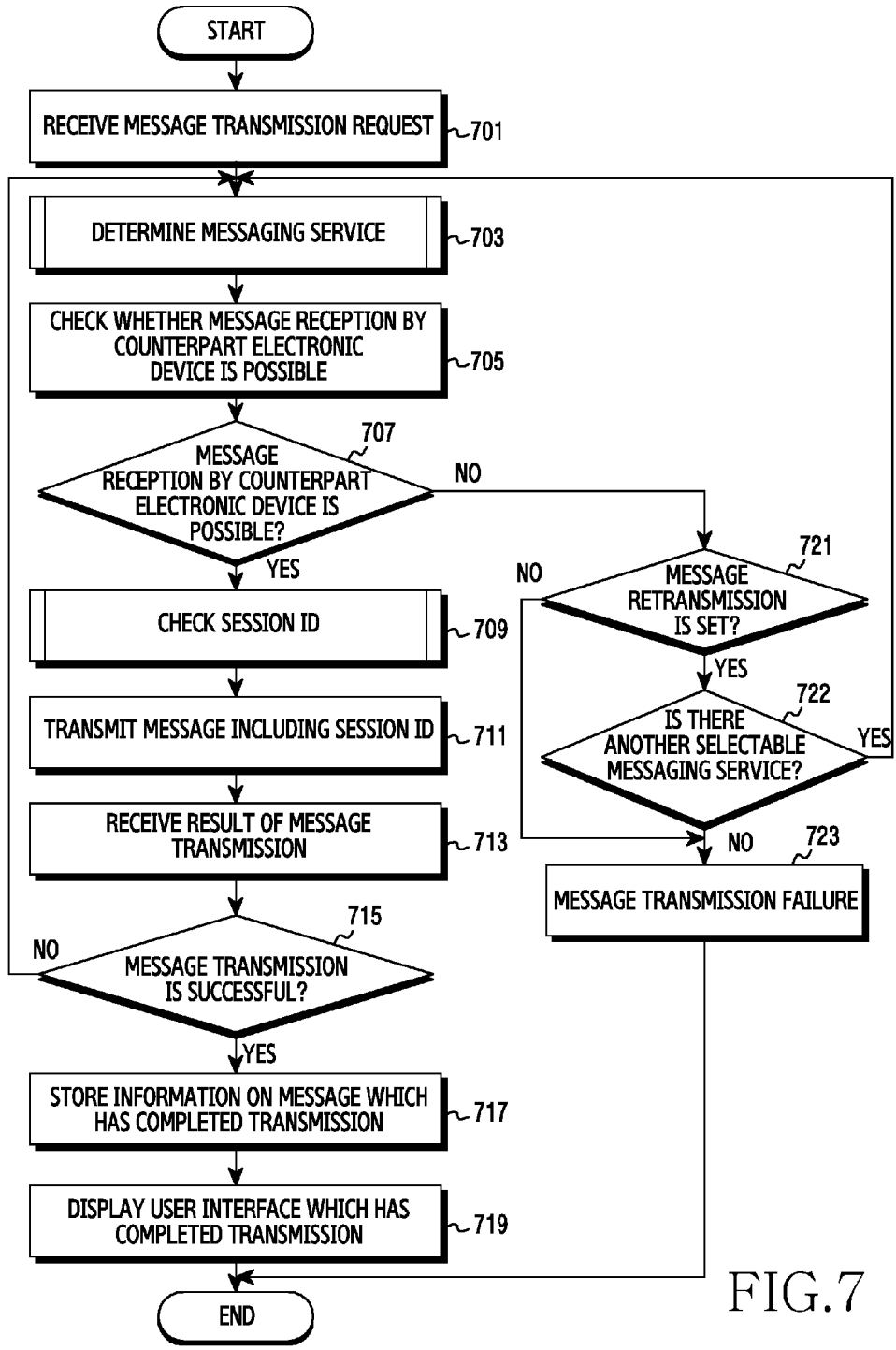
FIG. 7 is a flowchart illustrating an example method for transmitting a message by an electronic device according to various example embodiments.

FIG. 7 is a flowchart illustrating an example message transmission method by an electronic device according to various example embodiments.

Referring to FIG. 7, according to an embodiment of the present disclosure, in operation 701, the electronic device 101 (e.g., the processor 120) may receive a message transmission request. When the user enters a message content and a counterpart's phone number to which a message will be received, and then presses a button corresponding to "transmission" and "Check?", the processor 120 may determine that a request for message transmission has been made.

According to an embodiment of the present disclosure, in operation 703, the processor 120 may determine a messaging service. For example, the processor 120 may determine the messaging service using a user determination method or an automatic determination method. The user determination method may be two. In operation 701, the user may select a messaging service to which the message will be sent when entering the message content and counterpart's phone number. In this case, the determined messaging service may be a messaging service selected by the user. Alternatively, the user may previously set the priorities for messaging services, and the processor 120 may determine a messaging service based on the priorities. For example, the user may set a high priority for the user's most favorite messaging service or most frequently used messaging service. When the priorities are set for messaging services, an application corresponding to the messaging service may be installed or not in the electronic device 101. The processor 120 may determine a messaging service in the order of higher priorities.

According to an embodiment of the present disclosure, the automatic determination method may allow the processor 120 to determine one messaging service. The processor 120 may determine a messaging service by considering the user usability of the messaging service. For example, the processor 120 may determine a messaging service at least partially based on the number of times the messaging services have been used by the plurality of users, the number of times the messaging services have been used by the user, a messaging service recently used by the user, or a new messaging service. The number of times the messaging services have been used by the plurality of users may define the most frequently used messaging service by the plurality of users. The number of times the messaging services have been used by the user may define the most frequently used messaging service by the user. Alternatively, the processor 120 may determine a messaging service based on a condition set by default to the electronic device 101 that is being manufactured. Alternatively, the processor 120 may arbitrarily determine one messaging service among messaging services of a messenger application installed in the electronic device 101.

According to an embodiment of the present disclosure, in operation 705, the processor 120 may check whether message reception by a counterpart electronic device (for example, the second electronic device 420) which uses the determined messaging service is possible. To this end, the processor 120 may transmit, to the message account server 442, a counterpart's phone number and information (for example, a session ID) on the determined messaging service, through the communication interface 170. The message account server 442 may determine whether a corresponding session ID exists in the counterpart's phone number so as to determine whether the message reception by the counterpart electronic device is possible. The message account server 442 may transmit, to the electronic device 101, whether the message reception is possible based on whether the session ID corresponding to the counterpart's phone number exists. The processor 120 may receive whether the message reception is possible from the message account server 442.

According to an embodiment of the present disclosure, in operation 707, the processor 120 may determine whether the message reception is possible based on whether the message reception by the counterpart electronic device is possible. For example, when the message reception by the counterpart electronic device (for example, the second electronic device 420) which uses the determined messaging service (for example, the first messaging service) is possible, the processor 120 may perform an operation 709, and when the message reception by the counterpart electronic device which uses the determined messaging service is not possible, the processor 120 may perform an operation 721.

According to an embodiment of the present disclosure, in operation 721, the processor 120 may determine whether a 'message re-transmission' is set in the electronic device 101. When the 'message re-transmission' is set, the processor may determine that the message re-transmissions is allowed, and return to an operation 722. Alternatively, when the 'message re-transmission' is not set, the processor may perform an operation 723 so as not to perform the message re-transmission.

According to an embodiment of the present disclosure, in operation 722, when the "message re-transmission" is set, the processor may determine whether there is another selectable messaging service (for example, the second messaging service) other than the determined messaging service (for example, the first messaging service). When there is another selectable messaging service, the processor 120 may return to the operation 703, and when there is no messaging service to be selected, the processor 120 may perform the operation 723. According to various embodiments, when returning to operation 703, the processor 120 may select a messaging service (for example, the second messaging service) different from the first selected messaging service (for example, the first messaging service). The processor 120 may perform the operation 705 and operation 707 after selecting the second messaging service. At this time, upon performing the operation 721 and then returning to the operation 703, the processor 120 may select a messaging service (for example, a third messaging service) different from the secondly selected messaging service (for example, the second messaging service). The processor 120 may perform the operation 705 and the operation 707 after selecting the third messaging service. At this time, when the operation 721 is performed and there is no other selectable messaging service, the processor 120 may perform the operation 723.

According to an embodiment of the present disclosure, in operation 723, the processor 120 may determine that the message transmission has failed. For example, the processor 120 may display a user interface associated with the message transmission failure. The user interface associated with the message transmission failure may be displayed as a pop-up window. Alternatively, the user interface associated with the message transmission failure may display, on a message transmission window, a message notifying of the message transmission failure (e.g., ⓧ message transmission has failed.). The processor 120 may be terminated after processing the message transfer failure. According to various embodiments, the processor 120 may receive a retransmission request from the user on the user interface associated with the message transmission failure. In this case, the processor 120 may interpret the retransmission request as the message transmission request of operation 701, and perform the operation 703.

According to an embodiment of the present disclosure, in operation 709, the processor 120 may check a session ID. The processor 120 may search for a session ID corresponding to the determined messaging service from a session table (for example, the session table 620). When a session ID corresponding to the determined messaging service is retrieved from the session table, the processor 120 may check the retrieved session ID. When a session ID corresponding to the determined messaging service is not retrieved from the session table, the processor 120 may request for generation of a session ID to the message account server 442. In response to the session ID generation request, the processor 120 may receive the session ID from the message accounting server 442 and store the received session ID in the session table. The processor 120 may check the session ID stored in the session table.

According to an embodiment of the present disclosure, in operation 711, the processor 120 may transmit a message including the checked session ID. For example, the processor 120 may transmit a message including a message content, a counterpart's phone number, and a session ID. The processor 120 may transmit the message to the message transmission and reception server 441 through the communication interface 170.

According to an embodiment of the present disclosure, the message transmission server 441 may transmit the message to the counterpart electronic device (for example, the second electronic device 420) corresponding to the counterpart phone number. The message may include a message content, a counterpart's phone number (for example, the phone number of the first electronic device 410), a messaging service, and a session ID. The message transmission and reception server 441 may check whether the message has been successfully transmitted to the second electronic device 420. The message transmission and reception server 441 may notify the first electronic device 410 of whether the message has been successfully transmitted to the second electronic device 420.

According to an embodiment of the present disclosure, in operation 713, the processor 120 may receive a result of message transmission from the message transmission and reception server 441. According to various embodiments, the processor 120 may receive whether the message is checked by the counterpart from the message transmission and reception server 441.

According to an embodiment of the present disclosure, in operation 715, the processor 120 may return to the operation 703 or perform the operation 717 based on the message transmission result. For example, when the message transmission result is 'successful', the processor 120 may perform the operation 717. Alternatively, when the message transmission result is 'failure', the processor 120 may return to the operation 703.

According to various embodiments, when returning to the operation 703, the processor 120 may select a messaging service (for example, the second messaging service) different from the first selected messaging service (for example, the first messaging service). The processor 120 may perform the operation 705 and operation 707 after selecting the second messaging service. At this time, upon performing the operation 721 and then returning to the operation 703, the processor 120 may select a messaging service (for example, a third messaging service) different from the secondly selected messaging service (for example, the second messaging service). The processor 120 may perform the operation 705 and operation 707 after selecting the third messaging service. At this time, when the operation 721 is performed and there is no other selectable messaging service, the processor 120 may perform the operation 723.

According to various embodiments, when returning to the operation 703, the processor 120 may re-determine the first selected messaging service (for example, the first messaging service) according to the user setting or the electronic device 101's setting. For example, when the user setting corresponds to two times of re-transmission, the processor 120 may re-determine the first selected messaging service or another messaging service (for example, the second messaging service) based on the number of times of message transmission failures. That is, the processor 120 may count the number of times of message transmission failure when the message transmission has failed, and when the message transmission failure count does not exceed two times, the processor 120 may re-determine the first selected messaging service. Alternatively, when the message transmission failure count exceeds two times, the processor 120 may determine another messaging service (for example, the second messaging service).

According to an embodiment of the present disclosure, in operation 717, the processor 120 may store information on the message which has completed the transmission. For example, the processor 120 may store, in the memory 130, the message transmission history including at least one of a message content, a counterpart's phone number (or a counterpart's name), a thread ID corresponding to the counterpart's phone number, a messaging service, a session ID, or a message sending time. The processor 120 may update a session table based on the message transmission history. Alternatively, the processor 120 may select a further messaging service based on the message transmission history. Alternatively, the processor 120 may display a message in the conversation thread based on the message transmission history.

According to an embodiment of the present disclosure, in operation 719, the processor 120 may display a user interface for the completion of transmission. For example, the processor 120 may display a message content on a chat window in a conversation thread corresponding to a thread ID. According to various embodiments, the processor 120 may display on the chat window whether the counterpart has checked the message. For example, when the message is transmitted and the counterpart checks the message, the processor 120 may inform of the message checking by the counterpart to the user, by displaying 'Read', 'Checked', etc. on the chat window in the conversation thread. Alternatively, when the counterpart does not check the message, the processor 120 may allow the number '1' to be written on the message content, and when the counterpart has checked the message, the processor 120 may not write the number '1' on the message content.

Figure 8:
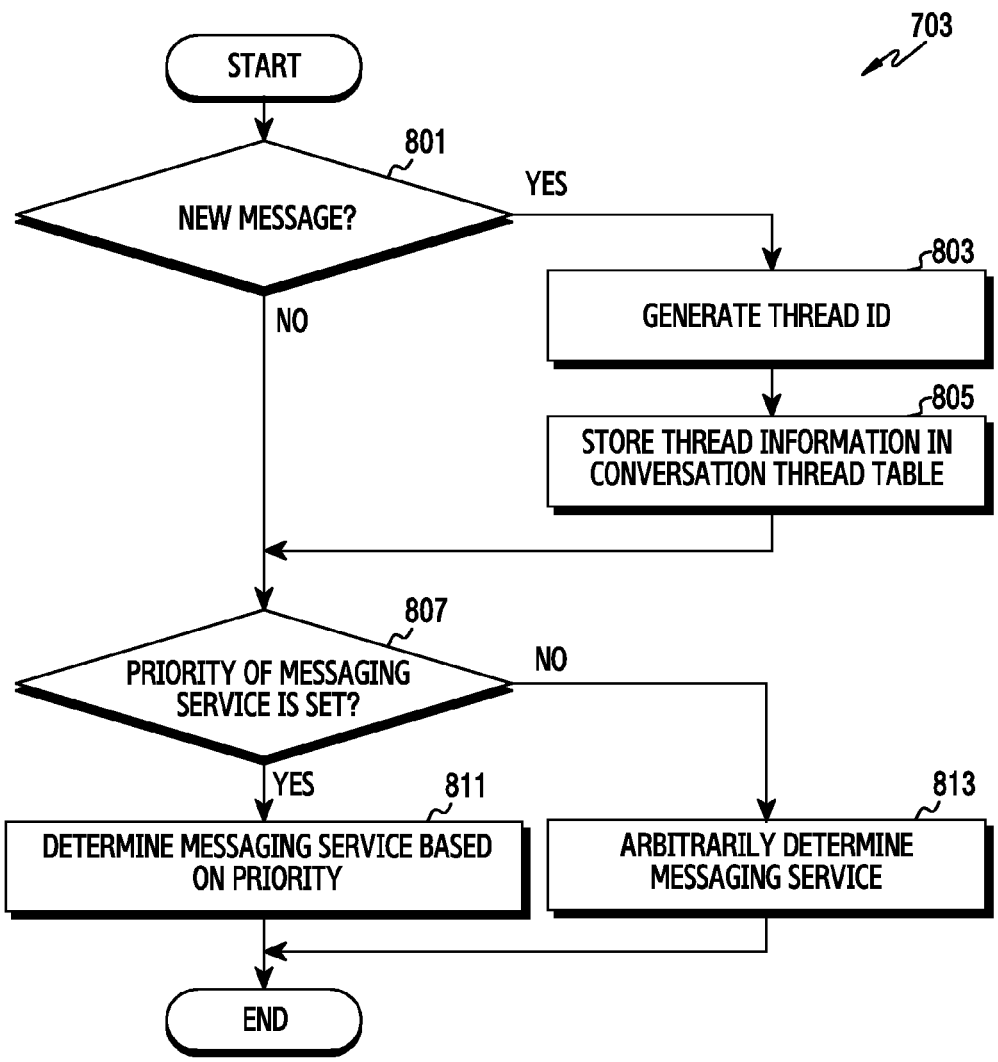
FIG. 8 is a flowchart illustrating an example method for determining a messaging service according to various example embodiments.

FIG. 8 is a flowchart illustrating an example method for determining a messaging service according to various example embodiments.

FIG. 8 illustrates a subroutine of the operation 703 of FIG. 7. Referring to FIG. 8, in operation 801, the processor 120 may determine whether there is a new message. For example, the processor 120 may determine whether a thread ID corresponding to a counterpart's phone number of a message being requested to be transmitted in operation 701 is stored in a conversation thread table (for example, the conversation thread table 610). When the thread ID corresponding to the counterpart's phone number is not stored in the conversation thread table, the processor 120 may determine that the message being requested to be transmitted is a new message.

According to an embodiment of the present disclosure, when the message being requested to be transmitted is not a new message, the processor 120 may perform an operation 807, and when the message being requested to be transmitted is a new message, the processor 120 may perform an operation 803.

According to an embodiment of the present disclosure, in a case of the new message, the processor 120 may generate a thread ID corresponding to a counterpart's phone number in operation 803. As described in the above, one thread ID may be assigned to a single phone number. The phone number may be an identification number of the electronic device, and may include at least one of IMSI, TMSI, MIN, MSISDN, IMEI, PIN, or header field information of P-Associated-URI. In addition, the phone number may include various embodiments which may be used according to a communication standard or a service provider's policy. In operation 805, the processor 120 may store thread information on the conversation thread table. The thread information may include a thread ID and a counterpart's phone number corresponding to the thread ID. The processor 120 may store, in the conversation thread table, the generated thread ID and a counterpart's phone number corresponding to the generated thread ID. The processor 120 may store, in the conversation thread table, thread information corresponding to the new message, and then perform an operation 807.

According to an embodiment of the present disclosure, in operation 807, the processor 120 may determine whether the priorities of messaging services are set. According to various embodiments, the user may previously set, in the electronic device 101, the priorities of messaging services. The processor 120 may perform an operation 811 when the priorities are set in the messaging services, and perform an operation 813 when the priorities are not set in the messaging service.

According to an embodiment of the present disclosure, when the priorities are set in the messaging services, in operation 811, the processor 120 may determine a messaging service based on the priorities. For example, when the user has set the priorities in the order of RCS, IM#1, IM#2, and SMS/MMS, the processor 120 may determine the RCS having the highest priority as the messaging service at first. Thereafter, when returning to operation 811, the processor 120 may determine the second highest IM#1 as the messaging service. Thereafter, when returning again to operation 811, the processor 120 may determine the third highest IM#2 as the messaging service. Thereafter, when returning again to operation 811, the processor 120 may determine the fourth highest SMS/MMS as the messaging service. When returning to the operation 811 even after determining all of the messaging services in which the priorities are set, the processor 120 may arbitrarily determine the messaging service. Alternatively, when returning to the operation 811 even after determining all of the messaging services to which the priorities are set, the processor 120 may determine that there is no selectable other messaging services.

According to various embodiments, the user may set a different priority for each counterpart's phone number. For example, SMS/MMS and IM#1 have the priority of a messaging service corresponding to a counterpart's phone number '010-1234-5678', IM#1 and IM#2 have the priority of the messaging service corresponding to a counterpart's phone number '010-3456-7890', and RCS and SMS/MMS have the priority of the messaging service corresponding to a counterpart's phone number '02-729-3521'. In this case, the processor 120 may determine a messaging service based on a counterpart's phone number for receiving the message and a priority corresponding thereto.

According to an embodiment of the present disclosure, when the priorities are not set in the messaging services, in operation 813, the processor 120 may arbitrarily determine a messaging service. For example, the processor 120 may determine a messaging service by considering the user usability thereof. For example, the processor 120 may determine a messaging service at least partially based on the number of times the messaging services have been used by the plurality of users, the number of times the messaging services have been used by the user, a message service recently used by the user, a messaging service recently used by the user, or a new messaging service. Alternatively, the processor 120 may determine a messaging service based on a condition set by default to the electronic device 101 being manufactured. Alternatively, the processor 120 may arbitrarily determine one messaging service among messaging services of a messenger application installed in the electronic device 101.

Figure 9A:
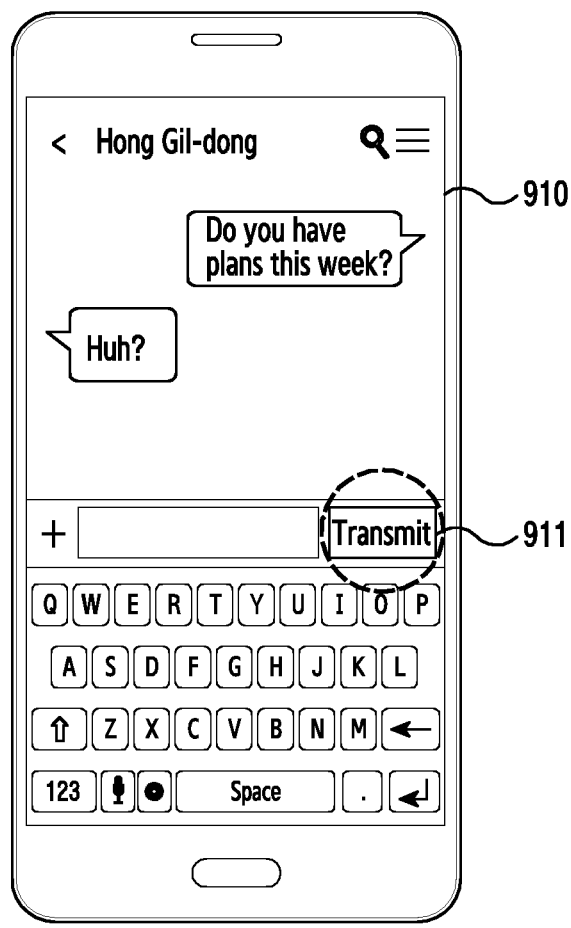
FIGS. 9A and 9B are diagrams illustrating an example user interface associated with a messaging service according to various example embodiments.
Figure 9B:
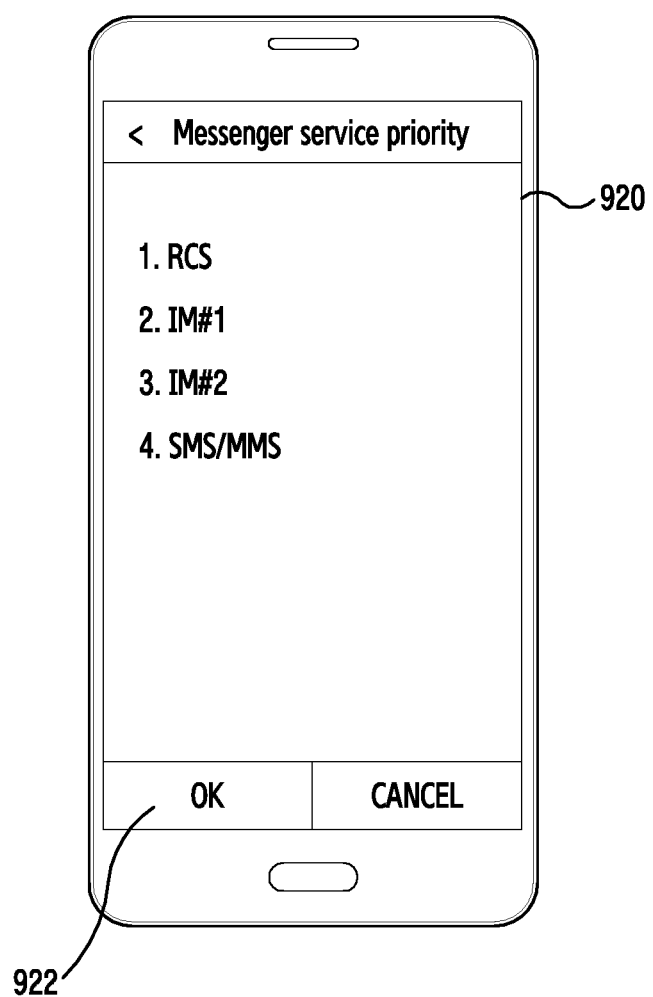

FIGS. 9A and 9B are diagrams illustrating an example user interface associated with a messaging service according to various example embodiments.

According to an embodiment of the present disclosure, FIG. 9A illustrates an example of receiving a message transmission request. Referring to FIG. 9A, the user interface 910 displays a chat window in a conversation thread. When message content and a counterpart's phone number are entered into the conversation thread, and then 'transmission button 911' is selected, the processor 120 may determine that a message transmission request has been made.

According to an embodiment of the present disclosure, FIG. 9B illustrates an example of setting the priority of the messaging service. Referring to FIG. 9B, the user interface 920 may be a screen in which the priority of the messaging service is set. The processor 120 may display a list of multiple messaging services capable of transmitting messages, and the user may set, in the processor 120, the priority of at least one messaging service among the displayed list. For example, the user interface 920 illustrates an example of setting the priorities in the order of RCS, IM#1, IM#2, and SMS/MMS. That is, it can be seen that the RCS has the highest priority, and followed in descending order by IM#1, IM#2, and SMS/MMS. The user has set the priority and then selects OK button 922 so that the priority setting may be completed.

Figure 10:
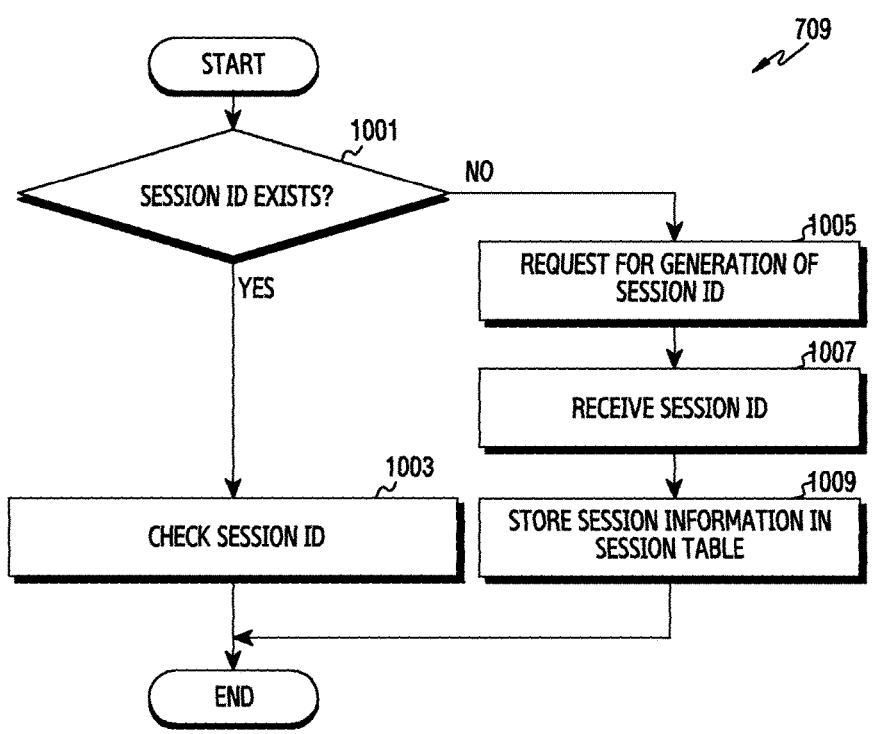
FIG. 10 is a flowchart illustrating an example method for checking a session ID according to various example embodiments.

FIG. 10 is a flowchart illustrating an example method for checking a session ID according to various example embodiments.

FIG. 10 illustrates a subroutine of the operation 709 of FIG. 7. Referring to FIG. 10, in operation 1001, the processor 120 may determine whether a session ID corresponding to a messaging service determined in operation 703 exists in a session table (for example, the session table 620).

According to an embodiment of the present disclosure, the processor 120 may perform an operation 1003 when the session ID exists in the session table, and perform an operation 1005 when the session ID does not exist in the session table.

According to an embodiment of the present disclosure, in operation 1003, the processor 120 may check a session ID stored in the session table.

According to an embodiment of the present disclosure, in operation 1005, the processor 120 may request for generation of a session ID to the message account server 442. The message account server 442 may receive the session ID generation request, and generate a session ID based on a messaging service for assigning the session ID and an electronic device (for example, a phone number of the electronic device) which made a request for the generation of the session ID. The message account server 442 may store the generated session ID in a database, and transmit the generated session ID to the electronic device which made a request for the generation of the session ID.

According to an embodiment of the present disclosure, in operation 1007, the processor 120 may receive a session ID from the message account server 442 in response to the session ID generation request.

According to an embodiment of the present disclosure, in operation 1009, the processor 120 may store the received session ID in the session table. The processor 120 may check the session ID stored in the session table.

Figure 11:
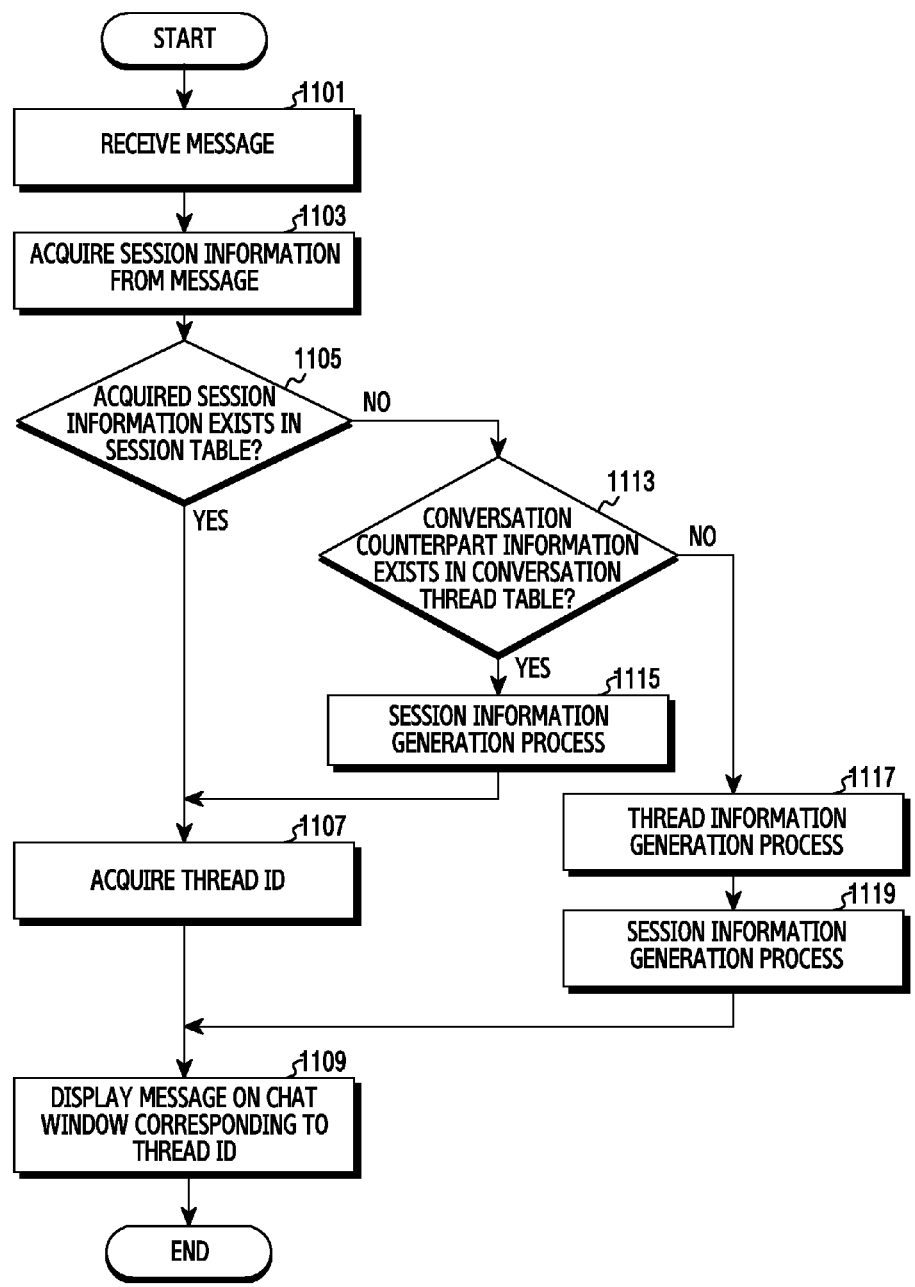
FIG. 11 is a flowchart illustrating an example method for receiving a message by an electronic device according to various example embodiments.

FIG. 11 is a flowchart illustrating an example method for receiving a message by an electronic device according to various example embodiments.

Referring to FIG. 11, in operation 1101, the electronic device 101 (e.g., the processor 120) may receive a message. The processor 120 may receive the message from the message transmission and reception server 441 through the communication interface 170. The processor 120 may receive a message including at least one of a message content, a counterpart's phone number, a message service, or a session ID.

According to an embodiment of the present disclosure, in operation 1103, the processor 120 may acquire session information from the received message. The session information may include a session ID.

According to an embodiment of the present disclosure, in operation 1105, the processor 120 may determine whether the acquired session information exists in a session table (for example, the session table 620). As described above, a type of a messaging service and a session ID corresponding to a thread ID may be stored in the session table.

According to an embodiment of the present disclosure, the processor 120 may perform an operation 1107 when the acquired session information exists in the session table, and perform an operation 1113 when the acquired session information does not exist in the session table.

According to an embodiment of the present disclosure, when the acquired session information exists in the session table, in operation 1107, the processor 120 may acquire a thread ID corresponding to the acquired session information. For example, the processor 120 may acquire, from the session table, a thread ID corresponding to the session ID.

According to an embodiment of the present disclosure, in operation 1109, the processor 120 may display a message on a chat window corresponding to the acquired thread ID. According to various embodiments, the processor 120 may execute a messaging service corresponding to the session ID, and display the message on a chat window corresponding to the acquired thread ID in the executed messaging service.

According to an embodiment of the present disclosure, when the acquired session information does not exist in the session table, in operation 1113, the processor 120 may determine whether conversation counterpart information exists in a conversation thread table (for example, the conversation thread table 610). The conversation counterpart information may indicate the counterpart's phone number, for example, a phone number of an electronic device (for example, the first electronic device 410) which has transmitted the message. As described above, conversation counterpart information corresponding to the thread ID may be stored in the conversation thread table. The processor 120 may determine whether the counterpart's phone number exists in the conversation thread table.

According to an embodiment of the present disclosure, the processor 120 may perform an operation 1115 when the conversation counterpart information exists in the conversation thread table, and perform an operation 1117 when the conversation counterpart information does not exist in the conversation thread table.

According to an embodiment of the present disclosure, when the counterpart's telephone number is stored in the conversation thread table, the processor 120 may return to the operation 1107 and acquire a thread ID corresponding to a counterpart's phone number from the conversation thread table.

According to an embodiment of the present disclosure, in operation 1115, the processor 120 may perform a session information generating process. For example, the session information generation process may include processes of: requesting for generation of a session ID to the message accounting server 442; receiving the generated session ID from the message accounting server 442; and storing the received session ID in the session table. The processor 120 may perform the session information generation process in order to generate a session ID of a messaging service for the received message. However, the operation 1115 may or may not be performed.

According to an embodiment of the present disclosure, when the conversation counterpart information does not exist in the conversation thread table, in operation 1117, the processor 120 may perform a thread information generation process. For example, the thread information generation process may include processes of: assigning a corresponding thread ID to the counterpart's phone number; and storing the assigned thread ID in the conversation thread table. The processor 120 may acquire a thread ID generated by performing the thread information generation process. When performing the operation 1117, the processor 120 may return to the operation 1109, and display a message on a chat window connected to the acquired thread ID.

According to an embodiment of the present disclosure, in operation 1119, the processor 120 may perform a session information generating process. For example, the session information generation process may include processes of: requesting for generation of a session ID to the message accounting server 442; receiving the generated session ID from the message accounting server 442; and storing the received session ID in the session table. However, the operation 1119 may or may not be performed.

According to various embodiments, in a case of SMS/MMS, a session ID may not be assigned. Since the SMS/MMS is not an IP-based message, the session ID may not be assigned thereto. When the messaging service of the received message corresponds to the SMS/MMS, the processor 120 may store a predetermined session ID in the session table. For example, the predetermined session ID may be "0000000000". That is, when the messaging service of the received message corresponds to the SMS/MMS, the processor 120 may store a predetermined session ID in the session table without requesting for generation of a session ID.

Figure 12:
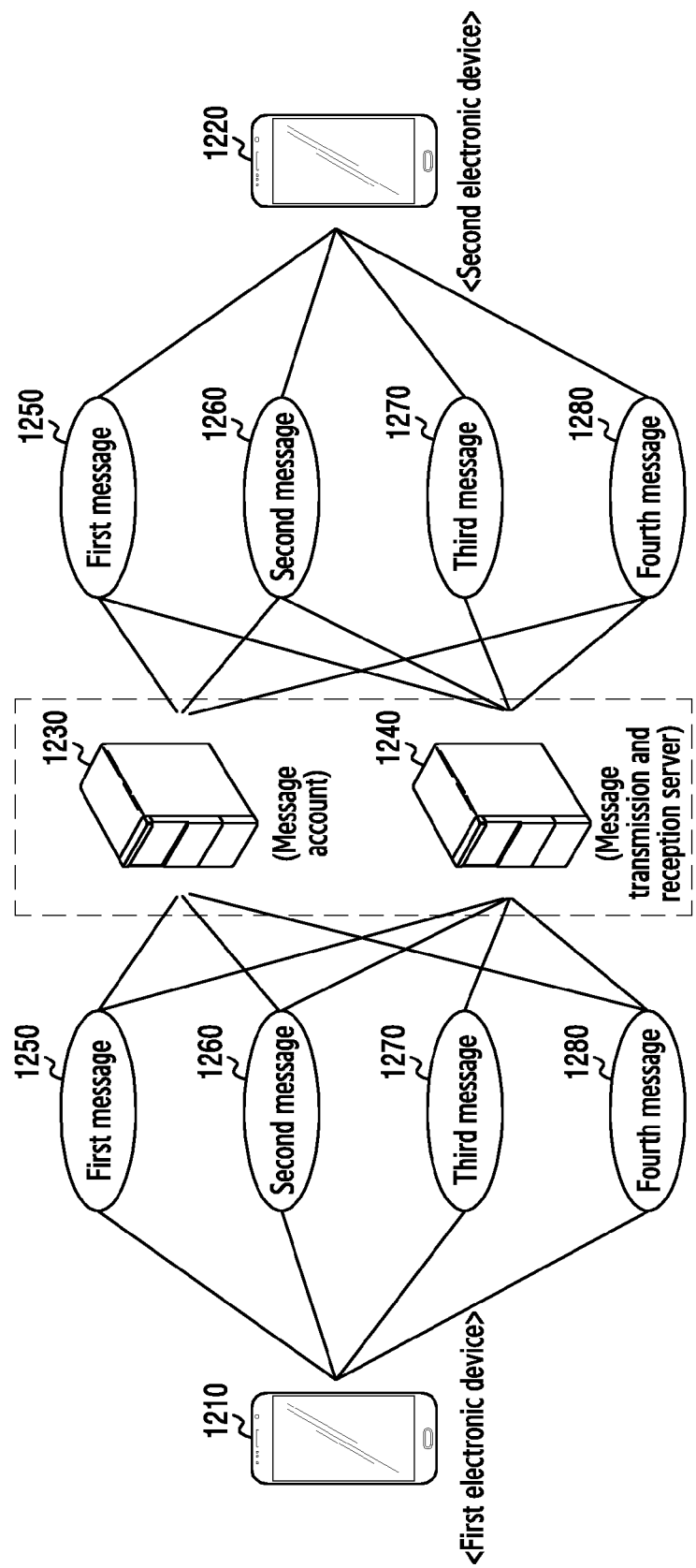
FIG. 12 is a diagram illustrating an example network environment for integrated processing a plurality of messaging services according to various example embodiments.

FIG. 12 is a diagram illustrating an example network environment for integrated processing a plurality of messaging services according to various example embodiments.

Referring to FIG. 12, the first electronic device 1210 may be an electronic device of a sender, and may be a device for transmitting a message through a messenger application. The first electronic device 1210 may store a conversation thread table and a session table in a memory (for example, the memory 130). The conversation thread table may store a thread ID corresponding to a counterpart's phone number (for example, a phone number of the second electronic device 1220). The session table may store a type of a messaging service and a session ID corresponding to a thread ID. The first electronic device 1210 may assign one thread ID per counterpart's phone number. The Session ID may be assigned from the message account server 1230, and one ID may be assigned to one messaging service corresponding to the thread ID.

According to an embodiment of the present disclosure, the second electronic device 1220 may be an electronic device of a recipient, and may be a device for receiving a message through the messenger application. The second electronic device 1220 may store a conversation thread table and a session table in a memory (for example, the memory 130). The conversation thread table may store a thread ID corresponding to a counterpart's phone number (for example, a phone number of the first electronic device 1210). The session table may store a type of a messaging service and a session ID corresponding to the thread ID. The second electronic device 1220 may assign one thread ID per counterpart's phone number. The session ID may be assigned from the message account server 1230, and one ID may be assigned to one messaging service corresponding to the thread ID.

According to an embodiment of the present disclosure, the message transmission and reception server 1240 may serve to transmit and receive the message, and may provide a message transmission and reception function, a function of checking whether the message transmission and reception is successful, a function of checking whether the message is received by the recipient, and the like. The message account server 1230 may serve as a server for managing users who have subscribed to a messaging service, and provide functions such as subscription, account management, and checking whether the subscription has been made.

For example, the first electronic device 1210 may check whether the reception of a first message 1250 of a first messaging service (for example, RCS) by a second electronic device 1220, through the message accounting server 1230, is possible. When the reception of the first message 1250 by the second electronic device 1220 is possible, the first electronic device 1210 may transmit the first message 1250 to the second electronic device 1220 through the message transmission and reception server 1240.

According to an embodiment of the present disclosure, when the reception of the first message 1250 by the second electronic device 1220 is not possible, the first electronic device 1210 may check whether the reception of a second message 1260 of the second messaging service (for example, IM#2) by the second electronic device 1220, through the message accounting server 1230, is possible. When the reception of the second message 1260 by the second electronic device 1220 is possible, the first electronic device 1210 may transmit the second message 1260 to the second electronic device 1220 through the message transmission and reception server 1240.

According to an embodiment of the present disclosure, when the reception of the second message 1260 by the second electronic device 1220 is not possible, the first electronic device 1210 may check whether the reception of a third message 1270 of a third messaging service (for example, SMS/MMS) by the second electronic device 1220, through the message accounting server 1230, is possible. When the reception of the third message 1270 by the second electronic device 1220 is possible, the first electronic device 1210 may transmit the third message 1270 to the second electronic device 1220 through the message transmission and reception server 1240.

According to an embodiment of the present disclosure, when the reception of the third message 1260 by the second electronic device 1220 is not possible, the first electronic device 1210 may check whether the reception of a fourth message 1280 of a fourth messaging service (for example, IM#1) by the second electronic device 1220, through the message accounting server 1230, is possible. When the reception of the fourth message 1280 by the second electronic device 1220 is possible, the first electronic device 1210 may transmit the fourth message 1280 to the second electronic device 1220 through the message transmission and reception server 1240.

According to various embodiments, when a message transmission is not performed using a first messaging service, the message is re-transmitted using a second messaging service, so that a cost burden caused by the message retransmission can be reduced and a seamless messaging service over a single messenger application can be provided.

A method for operating an electronic device according to various embodiments may include: displaying a user interface that provides, to one message thread, a plurality of messaging applications and outgoing and incoming messages associated with a plurality of messaging services; storing, in the memory, a plurality of first identifications (IDs) identifying communication with the external electronic device and/or an account associated with the external electronic device, using one of each of the plurality of messaging applications and the plurality of messaging services; storing, in the memory, at least one second ID identifying a message thread associated with communication with the external electronic device and/or an account associated with the external electronic device; receiving a new incoming message using at least one communication circuit; and selecting a message thread for the new incoming message at least partially based on at least one of the first IDs and the second ID.

The first ID may include a session ID, and the second ID may include a thread ID.

The thread ID may be associated with a phone number.

The phone number may include at least one of IMSI, TMSI, MIN, MSISDN, IMEI, PIN, or header field information of P-Associated-URI.

The session ID may be associated with a phone number.

The plurality of messaging services may include two or more of SMS, MIMS, Instant Messaging, and RCS.

The operation method may further include: determining a messaging service for transmitting an outgoing message, from among the plurality of messaging services; checking whether a message reception by a counterpart electronic device of a counterpart phone number, which will receive the outgoing message and which uses the determined messaging service, is possible; and determining another messaging service when the message reception using the determined messaging service is not possible.

The operation method may further include: checking whether the transmitted outgoing message is received by the counterpart electronic device; and determining another messaging service when the transmitted message is not received by the counterpart electronic device.

The operation method may further include: determining a messaging service which will transmit an outgoing message based on a user determination method, and the user determination method may be configured to receive a messaging service according to the user's selection when the message transmission is requested, or configured to determine the messaging service based on the priority previously determined by the user.

The operation method may further include: determining a messaging service which will transmit an outgoing message based on an automatic determination method, and the automatic determination method may be configured to arbitrarily select one messaging service or select the messaging service based on a predetermined condition, or determine a messaging service based on the number of times the messaging services have been used by the plurality of users, the number of times the messaging services have been used by the user, a messaging service recently used by the user, or a new messaging service.

The operation method may further include: storing a conversation thread table including a second ID associated with conversation counterpart information; acquiring session information from the received message when a message is received from a counterpart electronic device; acquiring the second ID based on the acquired session information; and displaying the received message in a message thread corresponding to the second ID.

The acquiring of the thread ID may include: when the session information does not exist in the memory, determining whether conversation counterpart information associated with the counterpart electronic device exists in the conversation thread table; and when the conversation counterpart information exists in the conversation thread table, acquiring a second ID corresponding to conversation counterpart information stored in the conversation thread table.

A computer-readable recording media can include a hard disk, a floppy disk, a magnetic media (e.g., a magnetic tape), an optical media (e.g., a Compact Disc-Read Only Memory (CD-ROM) and/or Digital Versatile Disk (DVD)), a Magneto-Optical Media (e.g., a floptical disk), an internal memory, etc. An instruction can include a code made by a compiler or a code executable by an interpreter. A module or a program module according to various example embodiments can further include at least one or more of the aforementioned constituent elements, or omit some, or further include another constituent element. Operations carried out by a module, a program module or another constituent element according to various example embodiments can be executed in a sequential, parallel, repeated or heuristic method, or at least some operations can be executed in different order or can be omitted, or another operation can be added.

The various example embodiments disclosed in the present disclosure and drawings are provided to aid in explanation of the technical features and aid in understanding, and are not intended to limit the scope of the present disclosure. Therefore, the scope of the present disclosure is defined not by the detailed description but by the appended claims, and all differences within the scope will be construed as being included in the present disclosure.

What is claimed is:

1. An electronic device comprising:
   a display;
   a communication module, comprising circuitry, configured to perform wireless communication with an external electronic device using one of a plurality of communication protocols;
   a processor electrically connected to the display and the communication module; and
   a memory electrically connected to the processor,
   wherein the memory stores a plurality of messaging applications for providing a corresponding plurality of messaging services, and the memory stores instructions which, when executed by a processor, cause the processor to perform operations comprising:
   displaying a user interface on the display, wherein the user interface is configured to provide, to one message thread, the plurality of messaging applications or outgoing and incoming messages associated with the plurality of messaging services;
   storing, in the memory, a plurality of first identifications (IDs) identifying communication with the external electronic device and/or an account associated with the external electronic device, using one of each of the plurality of messaging applications and the plurality of messaging services;
   storing, in the memory, at least one second ID identifying a message thread associated with communication with the external electronic device and/or the account associated with the external electronic device;
   receiving a new incoming message using the communication module;
   selecting a message thread for the new incoming message at least partially based on at least one of the first IDs and the second ID;
   determining a messaging service which will transmit an outgoing message, from among the plurality of messaging services; and
   checking whether message reception by a counterpart electronic device of a counterpart phone number which will receive the outgoing message is possible, using the determined messaging service among the plurality of messaging services.

2. The electronic device of claim 1, wherein the first ID comprises a session ID, and the second ID comprises a thread ID.

3. The electronic device of claim 2, wherein the thread ID is associated with a phone number.

4. The electronic device of claim 3, wherein the phone number comprises at least one of: International Mobile Station Identity (IMSI), Temporary Mobile Subscriber Identity (TMSI), Mobile Identification Number (MIN), Mobile Station International ISDN Number (MSISDN), International Mobile Equipment Identity (IMEI), Personal Identification number (PIN), and header field information on P-Associated-Uniform Resource Identifiers (URI).

5. The electronic device of claim 2, wherein the session ID is associated with a phone number.

6. The electronic device of claim 1, wherein the plurality of messaging services comprise two or more of: Short Message Service (SMS), Multimedia Message Service (MMS), Instant Messaging (IM), and Rich Communications Services (RCS).

7. The electronic device of claim 1, wherein the processor is configured to:
determine another messaging service when the message reception using the determined messaging service is not possible.

8. The electronic device of claim 1, wherein the processor is configured to:
check whether the transmitted message is received by a counterpart electronic device; and
determine another messaging service when the transmitted message is not received.

9. The electronic device of claim 1, wherein the processor is configured to determine the messaging service based on a user determination method, and
the user determination method is configured to receive a messaging service based on a received user selection when the message transmission is requested, or configured to determine the messaging service based on a predetermined priority.

10. The electronic device of claim 1, wherein the processor is configured to determine the messaging service based on an automatic determination method, and
the automatic determination method is configured to:
arbitrarily select one messaging service or select the messaging service based on a predetermined condition, and
determine a messaging service based on a number of times the messaging services have been used by the plurality of users, a number of times the messaging services have been used by the user, a messaging service recently used by the user, or a new messaging service.

11. The electronic device of claim 1, wherein, when a message is received from a counterpart electronic device, the processor is configured to:
acquire session information from the received message;
acquire a second ID based on the acquired session information; and
display the received message on a message thread corresponding to the second ID.

12. An electronic device comprising:
a display;
a communication module, comprising circuitry, configured to perform wireless communication with an external electronic device using one of a plurality of communication protocols;
a processor electrically connected to the display and the communication module; and
a memory electrically connected to the processor,
wherein the memory stores a plurality of messaging applications for providing one of a plurality of messaging services, and the memory stores instructions which, when executed by a processor, cause the processor to perform operations comprising:
displaying a user interface on the display, wherein the user interface is configured to provide, to one message thread, the plurality of messaging applications or outgoing and incoming messages associated with the plurality of messaging services;
storing, in the memory, a plurality of first identifications (IDs) identifying communication with the external electronic device and/or an account associated with the external electronic device, using one of each of the plurality of messaging applications and the plurality of messaging services;
storing, in the memory, at least one second ID identifying a message thread associated with communication with the external electronic device and/or the account associated with the external electronic device;
receiving a new incoming message using the communication module;
selecting a message thread for the new incoming message at least partially based on at least one of the first IDs and the second ID; wherein, when the session information does not exist in the memory, the processor is configured to:
determine whether conversation counterpart information associated with the counterpart electronic device exists in the conversation thread table; and
acquire a second ID corresponding to the conversation counterpart information stored in the conversation thread table.

13. A method of operating an electronic device, the method comprising:
displaying a user interface that provides, to one message thread, a plurality of messaging applications and outgoing and incoming messages associated with a plurality of messaging services;
storing, in the memory, a plurality of first identifications (IDs) identifying communication with an external electronic device and/or an account associated with the external electronic device, using one of each of the plurality of messaging applications and the plurality of messaging services;
storing, in the memory, at least one second ID identifying a message thread associated with communication with the external electronic device and/or the account associated with the external electronic device;
receiving a new incoming message; and
selecting a message thread for the new incoming message at least partially based on at least one of the first IDs and the second ID;
determining a messaging service which will transmit an outgoing message, from among the plurality of messaging services; and
checking whether message reception by a counterpart electronic device of a counterpart phone number which will receive the outgoing message is possible, using the determined messaging service among the plurality of messaging services.

14. The method of claim 13, wherein the first ID comprises a session ID, and the second ID comprises a thread ID.

15. The method of claim 14, wherein the thread ID is associated with a phone number.

16. The method of claim 15, wherein the phone number comprises at least one of: International Mobile Station Identity (IMSI), Temporary Mobile Subscriber Identity (TMSI), Mobile Identification Number (MIN), Mobile Station International ISDN Number (MSISDN), International Mobile Equipment Identity (IMEI), Personal Identification number (PIN), and header field information on P-Associated-Uniform Resource Identifiers (URI).

17. The method of claim 14, wherein the session ID is associated with a phone number.

18. The method of claim 13, wherein the plurality of messaging services comprise two or more of Short Message Service (SMS), Multimedia Message Service (MMS), Instant messaging (IM), and Rich Communications Services (RCS).

19. The method of claim 13, further comprising:
determining another messaging service when the message reception using the determined messaging service is not possible.

20. A method of operating an electronic device, the method comprising:

displaying a user interface that provides, to one message thread, a plurality of messaging applications and outgoing and incoming messages associated with a plurality of messaging services;

storing, in the memory, a plurality of first identifications (IDs) identifying communication with the external electronic device and/or an account associated with the external electronic device, using one of each of the plurality of messaging applications and the plurality of messaging services;

storing, in the memory, at least one second ID identifying a message thread associated with communication with the external electronic device and/or the account associated with the external electronic device;

receiving a new incoming message;

selecting a message thread for the new incoming message at least partially based on at least one of the first IDs and the second ID;

checking whether the transmitted outgoing message is received by a counterpart electronic device; and determining another messaging service when the transmitted message is not received by the counterpart electronic device.

\* \* \* \* \*